Nov. 19, 1963

C. R. CANTONWINE 3,111,616

ELECTRIC MOTOR CONSTRUCTION WITH VARIOUS
WINDING DISTRIBUTION FACTORS

Filed Jan. 29, 1962

INVENTOR

Charles R. Cantonwine

United States Patent Office 3,111,616
Patented Nov. 19, 1963

3,111,616
ELECTRIC MOTOR CONSTRUCTION WITH VARIOUS WINDING DISTRIBUTION FACTORS
Charles R. Cantonwine, 950 Airport Road,
Hot Springs, Ark.
Filed Jan. 29, 1962, Ser. No. 169,408
19 Claims. (Cl. 318—224)

This invention relates to motors in general and more particularly to improved means for starting and running alternating current (hereinafter abbreviated A.C.) motors which enable such motors to have increased starting and running torques and to operate more efficiently.

In the past, it has been the practice to provide A.C. motors with separate starting and running windings. Once these motors reached a predetermined speed, the starting winding was disconnected from the circuit or otherwise made ineffective and became deadweight at running speeds.

In my co-pending patent application Serial No. 661,634 filed May 27, 1957, now Patent No. 3,031,606, there is described an electric motor construction which uses all of the windings during starting and running, using a transfer switch comprising only two switch blades and two stationary contacts, one of which is double pointed and the other single pointed.

The present invention overcomes this objectionable feature of known motor construction by providing a relatively simple motor construction which uses all of the windings in the motor for running and starting, thereby increasing the torque and efficiency of the motor.

It is therefore a principal object of this invention to provide a single speed A.C. motor that employs all of its windings for starting and running.

Another object is to increase the power-factor efficiency, power and torque of A.C. motors.

Another object is to provide an A.C. motor with improved starting and running characteristics which is relatively simple and inexpensive to construct, using simplified switching means.

Another object is to provide an A.C. motor with improved pull-up, pull-in, and pull-out torque characteristics when changing between starting to running conditions and which reduces to a minimum the noise and vibration associated with these changes.

Another object is to substantially increase the torques and efficiency of A.C. motors by means that can be installed as original equipment or added as an improvement on existing motors.

Another object is to eliminate the need for a separate starting winding on A.C. motors.

Another object is to increase the output for a given size motor frame.

Aonther object is to enable one motor frame to be used for single phase and polyphase operation at the same ratings.

Another object is to permit the use of cheaper, more available materials in motors.

Another object is to permit the use of lighter weight material in a given motor frame without down rating the frame size.

Another object is to provide a pole changing motor circuit that can have approximately the same flux density at the lower number of poles as at the higher number of poles.

Another object is to provide a motor circuit that deactivates all phase shifting impedance devices by means other than by switch means directly connected thereto.

Another object is to provide an A.C. motor which can switch from a start to run condition at speeds greater than, equal to, or less than the running speed.

Another object is to provide an A.C. motor that is adaptable to being constructed with almost any desired starting and running characteristics.

Another object is to substantially reduce the undesirable inductive reactance and resistance inherent in the starting winding of capacitor start motors.

Another object is to provide switching means to energize at line voltage, or de-energize, external circuits, and other purposes, during the starting or running condition with no additional contacts, other than required as the motor starting switch.

Still another object is to provide means by which synchronous motors can drop into rather than pull into synchronous speed.

These and other objects and advantages of the present invention will become apparent after considering the following detailed specification in conjunction with the accompanying drawings.

Figure 1:
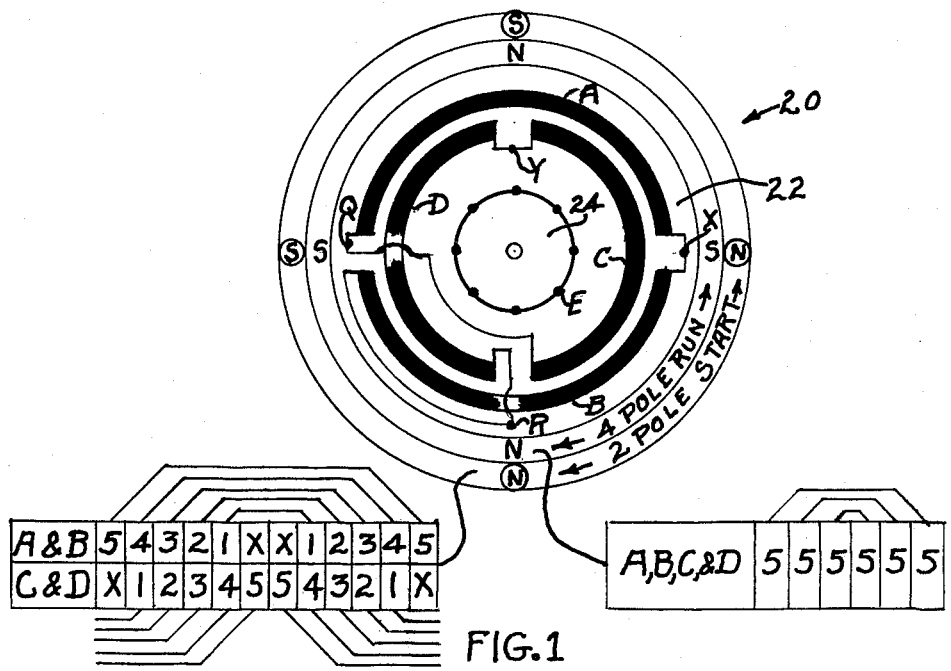
FIG. 1 is a schematic lay-out drawing showing a motor embodying the present invention.

Referring to the drawings by reference numbers, the number 20 in FIG. 1 refers to a motor which has a stator 22 and a rotor 24. The stator 22 has four symmetrically positioned windings designated A, B, C, and D and the rotor 24 has a winding designated E.

The stator windings A and B are opposite each other on the stator 22 (FIG. 1). Windings C and D are also opposite each other and are offset 90 electrical degrees from the windings A and B. Each of windings A, B, C, and D are herein defined as a pole winding group for a two pole motor, however for other number of poles, for example four pole, six pole, and so, each of the windings A, B, C, and D can consist of two or more pole winding groups.

Figure 2:
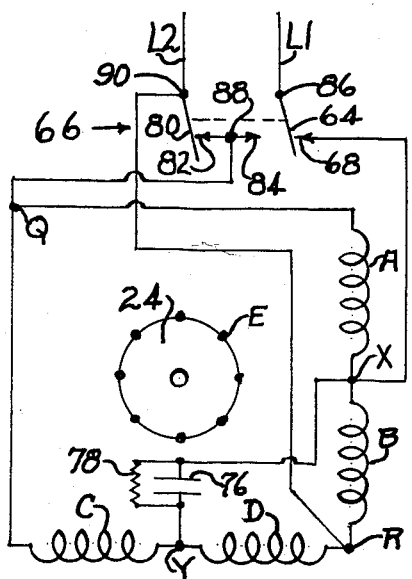
FIG. 2 is a schematic wiring diagram of the electrical circuit for the motor shown in FIG. 1, shown in the starting condition.
Figure 3:
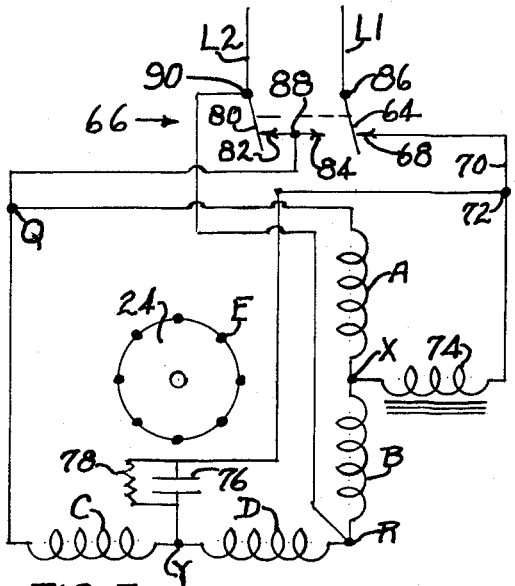
FIG. 3 is a schematic wiring diagram of the electrical circuit for the motor shown in FIG. 1, using a reactor in series with the main winding during starting, the circuit being shown in the starting condition.

Winding A is connected to winding B at X, winding B is connected to winding D at R, winding D is connected to winding C at Y and winding C is connected to winding A at Q. Therefore the windings A, B, C, and D are electrically connected together permanently in series to form a closed loop circuit as shown in FIGS. 1–3, having four junctions Q, R, X, and Y positioned therebetween.

The suggested 24 slot winding distribution chart labeled "2 pole start" of FIG. 1 is to the lower left of the motor 20 schematic lay-out, and the resulting, or consequent, distribution chart labeled "4 pole run" is to the lower right of the motor 20 schematic lay-out. The 2 pole start distribution chart shows a favorable two pole winding distribution to provide approximately the same or less flux density under the two pole starting condition as is realized under the four pole running condition. Usually the flux density ratio is about 1.414 to 1 when regrouping the windings, having the same distribution or having the same number of turns in each coil, from a two pole to a four pole connection (or stated inversely, the flux density ratio is one to the square root of two when regrouping from a four pole connection to a two pole connection, if the winding distribution is unchanged and having the same number of coils and the same number of conductors per coil). However, the objects of this invention can best be obtained when this ratio is less than 1.40 to 1 and preferably closer to a 1 to 1 ratio, or lower, as will be described more fully hereinafter. The two distribution charts shown in FIG. 1 show a different distribution factor, being higher for the two pole starting connection, than for the four pole running connection. The letters A, B, C, and D refer to the corresponding windings of motor 20. The numbers 1–5 represent the number of turns multiplied by a constant factor, such as 10 as used in the motor example cited hereinafter.

It should be noted that all slots are completely filled with the same number of conductors to provide maximum input capacity and output of the motor 20 under starting and running conditions. Windings A and B, in series, carry one half of the running load and windings C and D, in series, carry the other half of the running load, assuming the windings are the same, otherwise each would carry its proportional share of the load input. Therefore it is possible to obtain approximately 150% to 200% of the normal output from a given frame size, and thereby making it possible to make a single phase and polyphase motor, of the same horse power, interchangeable.

If desired aluminum wire can be used instead of copper wire without down rating the motor frame.

FIG. 2 shows the schematic wiring diagram of motor 20 connected to an A.C. source of energy. The diagram is shown in the starting condition with power leads L1 and L2 supplying energy to the motor 20. The lead L1 is connected to switch blade 64 which is located on switching device 66, the blade 64 is engaged with a normally-closed contact 68 and the contact 68 is connected to the stator windings A and B at X. The lead L2 is connected at junction 90 to a switch blade 80 which is ganged to operate in unison with switch blade 64 on the switching device 66 and during starting the switch blade 80 engages normally-closed contact 82 which is connected to the stator windings A and C at Q. The contact 82 is common with a normally-open contact 84 that is engaged with blade 64 in its transfer position. Switch blade 80 is also connected through junction 90 to stator windings B and D at R. Junction X is also connected to one side of a parallel connected capacitor 76 and resistor element 78, the other side of which is connected to windings C and D at Y.

In the starting condition of the motor, as described, the input voltage across leads L1 and L2 is impressed across four parallel circuits, each of which contains one of the stator windings. Two are from lead L1 to switch blade 64, contact 68 to X, and through the parallel combination of the stator windings A and B, through B to R to lead L2 and through A to Q through contact 82 switch blade 80 and to lead L2, the other two are from lead L1 blade 64 contacts 68 to X and through parallel connected capacitor 76 and resistor 78 and to Y, through the parallel connected combination of the stator windings C and D, through D to R and to lead L2, also through C to Q to contact 82 blade 80 and to lead L2. The parallel connected capacitor 76 and resistor 78 produces a phase shift between the windings C and D and the windings A and B, and this provides a very large starting torque for motor 20. Resistor 78 is required under certain conditions to prevent a charge from accumulating on capacitor 76 during the running condition, which will be explained more fully hereinafter.

The speed of motor 20 increases during the starting connection until a predetermined speed, approximately equal to the running speed, is reached at which time a centrifugal switching mechanism responds and transfers the switch blades 64 and 80 to positions disengaging from contacts 68 and 82 respectively and switch blade 64 engaging its normally-open contact 84. When this happens the line voltage is impressed across two parallel motor circuits, each containing two stator windings in series as follows; from lead L1 to blade 64, contact 84, to stator windings A and C at Q, through a parallel circuit consisting of windings A and B (in series) and windings C and D (in series) to R, and to lead L2. This is the running circuit for the motor 20, and in the running condition the voltage at connections X and Y is substantially the same (assuming that all of the stator windings have approximately the same impedance and the air gap is uniform). This being the case there is, theoretically, zero voltage and zero current flow between points X and Y. However, in actual commercial practice these ideal conditions cannot be expected and therefore a resistor 78 is incorporated. The capacitor 76 discharges initially through the windings of the motor, however, resistor 78 is provided primarily to prevent a charge from accumulating on capacitor 76 during the running condition, as will be explained hereinafter.

FIG. 3 shows the schematic wiring diagram of motor 20 connected to an A.C. source of energy. The diagram is shown in starting condition with power leads L1 and L2 supplying energy to the motor 20. The lead L1 is connected to switch blade 64 which is located on switching device 66, the blade 64 is engaged with a normally-closed contact 68 and the contact 68 is connected by lead 70 to junction 72 and to one end of a reactor element 74, the other end of reactor 74 is connected to stator windings A and B at X. Junction 72 is also connected to one side of the parallel combination of capacitor 76 and resistor 78, the other side of which is connected to windings C and D at Y. The lead L2 is connected to switch blade 80, which is ganged to act in unison with blade 64 on the switching device 66, and during starting, blade 80 engages normally-closed contact 82 which is connected to stator windings A and C at Q. The contact 82 is common with normally-open contact 84 that engages blade 64 in its transfer position. Switch blade 80 is also connected through junction 90 to stator windings B and D at R.

In the starting condition of the motor, as described, the input voltage across leads L1 and L2 is impressed across four parallel circuits, each of which contains one of the stator windings. Two are from lead L1 to switch blade 64 contact 68 through lead 70 to junction 72 through reactor 74 to windings A and B at X and through the parallel combination of the stator windings A and B, through B to R to lead L2, and through A to Q through contact 82, switch blade 80 and to lead L2, the other two are from lead L1 blade 64 contact 68 through lead 70 to junction 72 and to one side of the parallel combination of capacitor 76 and resistor 78 the other side of which is connected to windings C and D at Y through the parallel combination of the stator windings C and D, through D to R and to lead L2, also through C to Q to contact 82 blade 80 and to lead L2.

The parallel connected capacitor 76 and resistor 78 produces a phase shift in the stator windings C and D, and the reactor 74 produces a phase shift and voltage reduction to stator windings A and B and this provides a very large starting torque for the motor 20.

The motor of FIG. 3 is essentially the same as the motor in FIG. 2 except for a relatively low resistance reactor 74 in series with the stator windings A and B during starting. Reactor 74 is very important in one form of this invention as it permits a design whereby the main windings can have a normal flux density at reduced voltage during starting and also have normal flux density during running at full line voltage. Although the motor 20 connected as shown in FIG. 2 works better if the winding distribution is selected favoring the two pole starting connection and accepting a comprise four pole running distribution, the motor 20 shown as connected in FIG. 3 can have equally good, or better starting torque and better running characteristics if the running winding has a favored distribution factor by proper selection of reactor element 74 and proper selection of the distribution factors.

The running connections are the same in FIG. 2 and FIG. 3 except that in FIG. 3 reactor 74 is in series with the parallel combination of capacitor 76 and resistor 78 and connected across equipotential points X and Y, and are rendered ineffective during the running connection. There are therefore no active impedance devices in circuit during the single speed running connection. It is also obvious in FIGS. 2 and 3 that the phase shifting impedance devices, such as capacitor 76 and reactor 74, are deactivated by means other than by opening or closing the circuit or connections by switch means directly connected thereto.

It is important to note that during starting, the stator windings are connected having two poles positioned as shown in FIG. 1 and during running, with the switch operated, the stator windings are connected having four poles. Motor 20 can therefore be adapted to operate as a two speed motor with approximately the same horse power output at either speed because of the aforementioned 1 to 1 ratio of flux density, or other horse power ratios can be obtained by proper selection of the winding distribution as desired.

It is considered important to disclose herein that the circuits of this invention FIGS. 1–3, under running condition, will discriminate between the construction of the two general types of capacitors or condensers used for the starting capacitor 76 of FIGS. 2 and 3. The two general types of capacitors are herein defined as the dielectric type which can be of the oil, paper or mica type or similar construction; and the electrolytic type which is a device consisting of two series-opposed polarized cells. Although the words "capacitor" and "condenser" are often used synonymously to-day, at one time the dielectric type was known as a condenser, and when the electrolytic type was first extensively used commercially in the radio industry, it was distinguished from the condenser by the name of "capacitor." In this application it is preferred to maintain this distinction and the element 76 will therefore be referred to as a capacitor for the single speed high torque motor. It is anticipated here that any substitute for the electrolytic capacitor such as an intermittent duty motor starting capacitor of similar construction would be considered to be an equivalent, although the dielectric type of condenser is considered to be of different construction than the electrolytic type of capacitor in its application to this invention.

In the circuit of motor 20, the starting capacitor 76 is theoretically at zero potential during the running connection. However, if the rotor air gap is non-uniform, or if the bearings are slightly worn, a normal commercial expectancy, there is the possibility of a charge accumulating on capacitor 76 in pulses or increments of about the slip frequency of the rotor. If the condenser is of the dielectric type, the charge will dissipate at the end of each pulse. However, if the capacitor 76 is of the electrolytic type, then the charge holds in one-half of the capacitor, in one of the cells, and additively builds up to a high value causing an unbalance in the circuit resulting in very undesirable circulating currents in the motor windings. This phenomena, it is believed, is caused by the self-rectifying action and general nature of the electrolytic capacitor. There is a very distinct difference in the way these two types of devices accept a charge and discharge. It is not considered that the two types are equivalents in the running condition of motor 20, and are considered to be of different construction. It is therefore usually necessary to provide a relatively low resistance shunt across the electrolytic capacitor 76 in this circuit, at least during the running connection, either by switching means or by a permanently connected shunt as shown in FIGS. 2 and 3 by the resistance 78. It is not necessary to provide this low resistance if a dielectric type condenser is used for element 76, as for example in the two speed connection. However, there is no objection to so doing because the low resistance would then serve as a winding-to-winding equalizer during the running condition at the higher number of poles. Furthermore, the resistance 78 of FIGS. 2 and 3 need be only low enough to prevent a charge from accumulating on capacitor 76 during the running condition, said resistor is not considered as a usual capacitor residual charge, discharge resistor as the capacitor initially discharges through the relatively low impedance windings of the motor at the time the transfer switch operates to a running position. Resistor 78 is shown as a lumped ohmic resistor element, however, the same results can be obtained by having a predetermined value of leakage resistance within the capacitor itself, either by preselection or by design.

One form of motor 20 is essentially a single speed motor, and although it starts with a two pole connection, this is only incidental to accomplish another purpose, and it is permitted to reach only approximately one-half of the normal two pole running speed, which corresponds to the normal four pole running speed. This is controlled by speed responsive switch 66. Therefore, by properly selecting the operating speed for the centrifugal mechanism 66 the motor 20 can be made to transfer from the start to the run condition at a speed that is less than, equal to, or greater than the running speed. Usually however, it is desirable to adjust the switching device 66 to make the change-over at a speed slightly greater than the running speed so that the motor 20 drops into running speed rather than pulls into running speed. This eliminates or greatly reduces the shock and vibration which normally occurs during switch-over and enables motor 20 to be adjusted to have improved pull-up, pull-in and pull-out characteristics.

In the conventional, capacitor start, induction run motors, the running and starting torque of a two pole motor, for example, is only one-half the value of the running torque and about one-half of the starting torque of a four pole motor of the same horse power rating. In order to make the motor 20 comparable, in starting and pull-in torque, to a four pole motor it was necessary to develop a means of providing a super-high torque on the two pole connection of approximately twice the normal torque, in order to maintain the high torque rating on the four pole running connection. High torque is herein defined, and as rated by the industry, as the highest practicable torque values obtainable in a conventional motor construction using the usual series connected starting windings in conjunction with the starting capacitor. Super-high torque values are herein defined as values substantially higher than heretofore obtainable using the conventional construction of series connected starting windings. This super-high torque is developed in the present motor by designing the rotor for normal four pole running speed so that during the starting of the motor on the two pole connection, the rotor 24 winding E will have a relatively higher resistance in the two pole field, than in the four pole field, resulting in more power into the rotor and hence a very large starting torque. Furthermore, the starting windings are connected in parallel, or in at least two parallel circuits, which permits the use of a larger starting capacitor without reducing the pull-in torque, as in the case of series connected starting windings. Therefore full voltage can be developed across the capacitor thereby making the most economical use of the capacitor. The higher pull-in torque is partially caused by the fact that the counter E.M.F. generated in the parallel starting windings is only about one-half of the counter E.M.F. generated in the usual series connected starting winding. The distribution of the main and starting windings can also be predetermined to give the most desirable flux densities, consistent with desired running flux densities. Still further, since the main windings and the starting windings are both in parallel under the starting connection the most desirable flux distribution and phase relation to produce maximum torque is provided. This is partially due to the fact that the parallel circuits have only one-fourth of the inductive reactance as when they are series connected. Also low magnetic hum or noise level are obtained. With a reactor connected in series with the main winding as shown in FIG. 3, during the starting connection, the motor will develop maximum torque per ampere for this type of construction. It is therefore possible to obtain a perfect 90 degree split of phase and at unity power-factor with the present motor.

Windings A, B, C, and D are shown in FIG. 1 as having a coil span of less than 180 degrees, however, the coil span is not limited and can be any desired span from less than 90 degrees to over 180 degrees depending on the design requirements.

The stator and rotor windings can be either on the stationary member or on the rotatable member of motor 20. It is also anticipated that rotor 24 and winding E can be of any known construction other than the squirrel cage type illustarted, such as wound rotor with slip rings, armature with commutator and brushes, solid hysteresis type or similar known structural elements.

Speed responsive switch 66 of FIG. 2 and FIG. 3 can be either of the mechanical governor type actuating the movable switch contacts 80 and 64, to be in a starting position as shown, at speeds below a predetermined speed and in a running position at speeds above a predetermined speed, or said switch can be of the relay type actuated by changes of motor speed as reflected in a change of current or voltage in any part of the motor circuit, or any suitable equivalent thereof such as a manually operated switch to operate the motor as a two speed motor.

I have obtained good results by providing windings A and B with the same number of turns, same size wire and the same distribution as windings C and D as shown in FIG. 1. With a one-half horse power, 3450 r.p.m. (2 pole), 120 volt, 60 cycle, single phase motor, connected as shown in FIGS. 1 and 3, using suitable reactor 74 and a 600 mfd. capacitor 76 shunted by a 100 ohm resistor 78, I obtained a starting torque of 105 ounce feet which is 860% of full load running torque of a two pole one-half horse power motor, or 430% of the full load running torque of a four pole one-half horse power motor. This torque was obtained with a locked rotor current of 39 amperes, main winding current 27.5 amperes, starting winding current of 27.5 amperes with 120 volts developed across the capacitor. In the four pole running connection of the same motor I obtained a full one-half horse power output at 1750 r.p.m., with 8.5 amperes 600 watts input, with 216% pull-out torque, and a pull-in torque at 1800 r.p.m. of 275%, exceeding the pull-out or breakdown torque. The same motor connected as shown in FIG. 2 (without reactor 74 FIG. 3) had slightly less starting torque and slightly higher starting current, the running characteristics were the same.

It is well known that the starting torque of a single phase induction motor, with the main and starting windings displaced 90 electrical degrees, is proportional, among other things, to the product of the following three design factors, that is:

Factor 1: "The sine of the angle of phase displacement between the currents in the two windings." In motor 20 it is possible to obtain a perfect 90 degree displacement, since the sine of 90 degrees is 1.0, the maximum is reached for factor 1.

Factor 2: "The product of the main winding current multiplied by the starting winding current." In motor 20 it is possible to have the same current in the starting winding as in the main winding, therefore the maximum is reached for factor 2, and is limited only by the main winding current or the total allowable current.

Factor 3: "The number of turns or effective conductors in the starting winding." In motor 20 wherein the inductive reactance and resistance of the starting windings are only one-fourth of the value as when series connected, the number of effective conductors is limited only by the available slot space, which provides a maximum for factor 3.

With a favorable combination of, and the product of, the three said design factors satisfied at maximum limitations, it is obvious that motor 20 of this invention will provide means for producing the maximum possible starting torque for this type of construction, and with no sacrifice in pull-in torque or other desirable characteristics.

It is important to note that there are many additional novel purposes for switch 66 of FIGS. 2 and 3 other than as a starting switch, without additional contacts or blades, at least a part of which are herein anticipated. Switch 66 comprises two switch blades ganged to act in unison, and having two stationary contacts, one of which has a single point, and the other one of which is a common contact to the two blades, or as shown schematically in FIGS. 2 and 3 may have double points, double area points, or back-to-back points. However, contacts 82 and 84 can be a single pointed contact when the blades are arranged for wiping action slideable over the contacts, or blades that traverse the two stationary contacts in any manner, which constitutes a simpler switch means than any known construction motor having very large starting torque as described herein.

An important purpose for switch 66 is to use it as an "off" and "on" switch to stop and start motor 20. When switch blade 64 is positioned intermediate to and disengaged from the stationary contacts 68 and 84, and blade 80 disengaged from contact 82, the line current through lead L1 is interrupted, and the motor stops.

Another purpose for switch 66 is to use it to switch external circuits which can be energized at line voltage during the starting connection and the same circuit de-energized during the running connection by connecting the external circuit, such as magnetic brakes, valves, clutches and the like, across junctions 86 and 88. Also external circuits can be de-energized during the starting connection and energized at line voltage during the running connection by connecting the circuit across junctions 88 and 90.

Another purpose of switch 66 is to use the switch, either manually or automatically, for "jogging" the motor speed while running, to decrease or increase the speed at intervals to synchronize with other operations, for example. This is accomplished by holding switch blades 64 and 80 at an intermediate point, or "off" position, to let the motor lose speed, or to hold switch blades 64 and 80 in the starting position to cause the motor to operate on the two pole connection momentarily to run at a higher speed than the normal four pole running speed.

Another purpose of switch 66 is to use it as a "safety switch" to disconnect the power instantly if the motor is stalled from a running position, to be reset at will to start again. This can be accomplished by using a simple one-way latch (not shown) in conjunction with switch 66, this latch would permit the motor to start and move switch blades 64 and 80 to the running position, however, when the motor is stalled from the running condition, the switch blades 64 and 80 would be latched in the "off" position thereby disconnecting the power to the motor. To restart the motor, disengage the latch permitting the switch blades 64 and 80 to assume their normal starting position.

Still another purpose of switch 66 is to provide dual thermal overload or fused protection, with one value for the starting current of the motor connected between contact 68 and junction X of FIG. 2, or between contact 68 and junction 72 of FIG. 3, and another value for the motor running current connected between contact 84 and junction 88.

It is now apparent that there has been provided a novel motor construction which fulfills all of the objects and advantages sought therefor. Furthermore, this invention is intended to cover all changes, alterations and modifications of the examples of the invention herein chosen for purposes of disclosure, which do not constitute departures from the spirit and scope of the invention, and all such changes, alterations and modifications which will be readily apparent to one skilled in the art are contemplated as being within the scope of the present invention which is limited only by the claims which follow.

What I claim is:

1. A single speed, high torque, self starting A.C. motor comprising a stator having a stator winding thereon and a rotor having a rotor winding thereon, one of said windings having four separate symetrically positioned winding portions, each of said four portions including at least one pole winding group having a different number of conductors in some of the coils than in the others, and all of said four portions to be permanently connected in series to form a closed loop circuit having four junctions positioned therebetween, speed responsive switch means movable between a starting position when the motor is operated below a predetermined speed and a running position when the motor exceeds said predetermined speed, said switch means comprising two switch blades and two stationary contacts, one of said two stationary contacts to have a single point and the other of said two stationary contacts to be double pointed, means including the starting position of said switch means connected between an A.C. source of energy and selected ones of said junctions so that two of said four winding portions are positioned in space quadrature and are connected to be in magnetic quadrature to the other two of said four winding portions, said two winding portions to act as the main motor windings, and the said other two of said winding portions to act as the motor starting winding, phase shifting impedance device means having relatively low resistance connected to at least one of said windings to change the phase thereof with respect to the other winding, means including the running position of said switch means connecting the four winding portions in space quadrature across the said source of energy.

2. The motor defined in claim 1 wherein said phase shifting impedance device include a capacitor shunted by a relatively low resistance element connected in a series circuit with the said starting winding during the starting position of said swtch means.

3. The A.C. motor defined in claim 1 wherein the said two switch blades and said two stationary contacts are arranged so that the said blades traverse the said two stationary contacts, and the said other of said two stationary contacts to be single pointed.

4. A single speed, high torque, self starting A.C. motor comprising a stator having a stator winding thereon and a rotor having a rotor winding thereon, one of said windings having four separate symetrically positioned winding portions, each of said four winding portions including at least one pole winding group and all of said four portions to be permanently connected in series to form a closed loop circuit having four junctions positioned therebetween, speed responsive switch means movable between a starting position when the motor is operated below a predetermined speed and a running position when the motor exceeds said predetermined speed, said switch means comprising two switch blades and two stationary contacts, one of said two stationary contacts to be single pointed, and the other of said two stationary contacts to be double pointed, means including the starting position of said switch means connected between a source of energy and selected ones of the said four junctions so that two of said four winding portions are positioned in space quadrature and are connected to be in magnetic quadrature to the other two of said four winding portions, said two winding portions to act as the main motor winding, and the said other two of said winding portions to act as the motor starting winding, phase shifting impedance device means, having relatively low resistance, connected to at least one of said main and starting windings to change the phase thereof with respect to the other winding, said means including reactor, capacitor and resistor means connected so that the said reactor means is in a series circuit with the said main winding and said capacitor shunted by said resistor is connected in a series circuit with the said starting winding, means including the running position of said speed responsive switch means connecting the said four winding portions in space quadrature across the said source, said source connected to two of said four junctions and connecting said phase shifting impedance devices in a circuit across the other two of said four junctions, said four winding portions having a predetermined distribution of the windings to provide, in conjunction with the paramaters of the said phase shifting impedance devices, approximately the same relative flux densities during the starting connection as during the running connection of said motor.

5. The A.C. motor defined in claim 4 wherein the said two switch blades and said two stationary contacts are arranged so that the said blades traverse the said two stationary contacts, and the said other of said two stationary contacts to be single pointed.

6. A single speed, high torque, self starting A.C. motor comprising a stator having a stator winding thereon and a rotor having a rotor winding thereon, one of said windings having a plurality of main winding portions and a plurality of starting winding portions positioned at a space angle relative to the said main winding portions, speed responsive switch means movable between a starting position when the motor is operated below a predetermined speed and a running position when the motor exceeds said predetermined speed, said switch means comprising two switch blades and two stationary contacts, one of said two stationary contacts having a single point, and the other of said two stationary contacts having double points, said switch means also including means for moving said switch blades to an inoperative position in which said motor windings are de-energized, and said switch means adaptable to switching purposes other than functioning as a starting switch, using the same blades and contacts thereon, means including the starting position of said switch means connecting the said main winding portions in at least two parallel circuits and connecting the said starting winding portions in at least two parallel circuits, at least one phase shifting impedance device means connected in series circuit with at least one of said parallel circuits, and both of said main and starting winding circuits connected to an A.C. source of energy and connected for predetermined polarities to provide a plurality of magnetic poles in the starting position of said switch means, means including the running position of said switch means connecting the said main winding portions in a series circuit and connecting the said starting winding portions in a series circuit, said last two named series circuits to be connected in parallel and across the said A.C. source, said phase shifting impedance devices to be serially connected in a circuit between an intermediate point on each of the said series connected main and starting winding portions, said series connected main and starting winding portions to be connected for predetermined polarities to provide twice the number of poles in the running position than in the starting position of said switch means, said one of said windings to be wound in slots to have a predetermined winding distribution to provide a different distribution factor during the starting than during the running position of said switch means.

7. The motor defined in claim 6 wherein the said at least one phase shifting impedance device include an electrolytic motor starting capacitor shunted by a relatively low value resistor element and connected in a series circuit with the said starting winding during the starting position of said switch means.

8. The motor defined in claim 6 wherein at least one phase shifting impedance device means include a reactor element connected in a series circuit with the said main winding during the starting position of said switch means.

9. The motor defined in claim 6 wherein said different distribution factor be predetermined to provide magnetic fluxes, of the said plurality of magnetic poles and said twice the number of poles that are approximately in the relation of 1 to 1 to each other.

10. The motor defined in claim 6 wherein the said two switch blades and said two stationary contacts are arranged so that the said blades traverse the said two stationary contacts, and the said other of said two stationary contacts have a single point.

11. A single phase A.C. motor comprising a stator having a stator winding thereon and a rotor having a rotor winding thereon, one of said windings arranged for changing the number of poles in the relation of 1 to 2, and said one of said windings having a pair of main winding sections, and a pair of starting winding sections positioned at a space angle relatve to the said pair of main winding sections, switch means movable between a starting position and a running position having an inoperative position intermediate to said starting and running position, said switch means comprising two switch blades and two stationary contacts, one of said two stationary contacts to have a single point and the other of said two stationary contacts to be double pointed, means including the starting position of said switch means connecting, for the lower number of poles, said pair of main winding sections in parallel, and connecting said pair of starting winding sections in parallel, and across an A.C. source of energy including a phase shifting impedance device means connected to at least one of said pairs of winding sections to produce a very large starting torque, said winding sections arranged to have one distribution factor and to provide relatively high values of the three important design factors, said factors including a large angle of phase displacement of the current between the said main and starting winding sections, and a large product of current in the main winding sections when multiplied by the current in the said starting winding sections, and a large number of effective conductors in said starting winding sections, means including the running position of said switch means connecting said winding sections for the higher number of poles by arranging the said pair of main winding sections in series and the said pair of starting winding sections in series, said two series connected windings connected in parallel across said A.C. source to provide a full composite running winding, said running position of said switch means providing another winding distribution factor than is provided during the starting position of said switch means, said running position of said switch means deactivating all of said phase shifting impedance device means by means other than by switch means directly connected thereto.

12. The A.C. motor defined in claim 11 wherein the said one winding distribution factor, at the lower number of poles, to be provided by a different number of conductors in some of the coils than in the others, and the said another winding distribution factor, at the higher number of poles, to be provided by the numerical sum of all the conductors in each slot of a pole winding group.

13. The A.C. motor defined in claim 11 wherein the said two switch blades and said two stationary contacts are arranged so that the said blades traverse the said two stationary contacts, and the said other of said two stationary contacts to be single pointed.

14. A two speed, single phase A.C. motor comprising a stator having a stator winding thereon and a rotor having a rotor winding thereon, one of said windings arranged for changing the number of poles in the relation of 1 to 2, and said one of said windings having a pair of main winding sections, and a pair of starting winding sections positioned at a space angle relative to the said pair of main winding sections, switch means movable between a starting position at the lower number of poles, and a running position at the higher number of poles, said switch means comprising two switch blades and two stationary contacts, one of said two stationary contacts to have a single point and the other of said two stationary contacts to be double pointed, means including the starting position of said switch means connecting, for the said lower number of poles, said pair of main winding sections in parallel, and connecting said pair of starting winding sections in parallel, and across an A.C. source of energy including a phase shifting impedance device means connected to at least one of said pairs of winding sections, said phase shifting impedance device means to include a dielectric type of continuous duty condenser connected in series with said pair of parallel connected starting winding sections, means including the running position of said switch means connecting said winding sections for the higher number of poles by arranging the said pair of main winding sections in series and the said pair of starting winding sections in series, said two series connected windings connected in parallel across said A.C. source to provide a full composite running winding, said winding sections to be prearranged having a different number of conductors in some of the coils than in others to provide a flux density at the lower number of poles that will have a ratio of less than 1.40 to 1 relative to the flux density at the higher number of poles.

15. The motor defined in claim 14 wherein the said phase shifting impedance device means also include a reactor connected in series with said pair of parallel connected main winding sections.

16. The motor defined in claim 14 wherein the said two switch blades and said two stationary contacts are arranged so that the said blades traverse the said two stationary contacts, and the said other of said two stationary contacts to be single pointed.

17. A single phase A.C. motor comprising a stator having a stator winding thereon and a rotor having a rotor winding thereon, one of said windings arranged for changing the number of poles in the relation of 1 to 2, and said one of said windings having a pair of main winding sections, and a pair of starting winding sections positioned at a space angle relative to the said pair of main winding sections, switch means movable between a starting position and a running position comprising two switch blades traversing two separate stationary contact points, means including the starting position of said switch means connecting, for the lower number of poles, said pair of main winding sections in parallel, and connecting said pair of starting winding sections in parallel, said parallel connected winding sections connected across an A.C. source of energy including at least one phase shifting impedance device connected thereto, said phase shifting impedance device including a condenser shunted by a resistor element connected serially with the said parallel connected starting winding sections, means including the running position of said switch means connecting said winding sections for the higher number of poles by arranging the said pair of main winding sections in series, and said pair of starting winding sections in series, said two series connected windings connected in parallel across said A.C. source to provide a full composite running winding and deactivating all of said phase shifting impedance devices by means other than by switch means directly connected thereto.

18. The motor defined in claim 17 wherein said condenser be of electrolytic type capacitor construction as distinguished from dielectric type condenser construction.

19. The motor defined in claim 17 wherein said at least one phase shifting impedance device include a reactor element connected serially with the said parallel connected main winding sections.

References Cited in the file of this patent

UNITED STATES PATENTS

| 1,912,337 | Kennedy | May 30, 1933 |
|---|---|---|
| 2,243,070 | Cain | May 27, 1941 |
| 2,646,538 | Lewis | July 21, 1953 |
| 2,808,554 | Capps | Oct. 1, 1957 |
| 2,817,050 | La Cour | Dec. 17, 1957 |
| 2,823,342 | Suhr | Feb. 11, 1958 |
| 3,031,606 | Cantonwine | Apr. 24, 1962 |
| 3,068,389 | Cantonwine | Dec. 11, 1962 |